(12) United States Patent
Lassovsky

(10) Patent No.: US 8,889,006 B2
(45) Date of Patent: Nov. 18, 2014

(54) SYSTEM FOR WASTEWATER TREATMENT USING AQUATIC PLANTS

(71) Applicant: Leon A. Lassovsky, Seville (ES)

(72) Inventor: Leon A. Lassovsky, Seville (ES)

(*) Notice: Subject to any disclaimer, the term of this patent is extended or adjusted under 35 U.S.C. 154(b) by 133 days.

(21) Appl. No.: 13/828,243

(22) Filed: Mar. 14, 2013

(65) Prior Publication Data

US 2014/0202954 A1 Jul. 24, 2014

Related U.S. Application Data

(60) Provisional application No. 61/754,742, filed on Jan. 21, 2013.

(51) Int. Cl.
 *C02F 3/32* (2006.01)
(52) U.S. Cl.
 CPC ..................................... *C02F 3/327* (2013.01)
 USPC ..................... 210/602; 210/150; 210/242.1
(58) Field of Classification Search
 CPC ....................................................... C02F 3/327
 USPC ................................ 210/602, 150, 151, 242.1
 See application file for complete search history.

(56) References Cited

U.S. PATENT DOCUMENTS

| | | | |
|---|---|---|---|
| 2,639,549 A | 5/1953 | Wubben et al. | |
| 3,456,385 A | 7/1969 | Plath | |
| 3,927,491 A | 12/1975 | Farnsworth | |
| 4,037,360 A | 7/1977 | Farnsworth | |
| 4,086,161 A | 4/1978 | Burton | |
| 4,169,050 A | 9/1979 | Serfling et al. | |
| 4,333,837 A | 6/1982 | Plosz et al. | |
| 4,487,588 A | 12/1984 | Lewis, III et al. | |
| 4,536,988 A | 8/1985 | Hogen | |
| 4,855,040 A | 8/1989 | Kickuth | |
| 4,995,969 A | 2/1991 | LaVigne | |
| 5,096,577 A | 3/1992 | Ngo et al. | |
| 5,106,504 A | 4/1992 | Murray | |
| 5,143,020 A | 9/1992 | Patrick | |
| 5,207,733 A | 5/1993 | Perrin | |
| 5,224,292 A | 7/1993 | Anton | |
| 5,261,185 A | 11/1993 | Koide et al. | |
| 5,312,601 A | 5/1994 | Patrick | |
| 5,337,516 A | 8/1994 | Hondulas | |

(Continued)

FOREIGN PATENT DOCUMENTS

JP 2002-142584 A * 5/2002
RU 2157794 C1 10/2000

(Continued)

OTHER PUBLICATIONS

International Search Report and Written Opinion for co-pending PCT application PCT/US2014/012259 issued May 29, 2014.

*Primary Examiner* — Fred Prince
(74) *Attorney, Agent, or Firm* — Gifford, Krass, Sprinkle, Anderson & Citkowski, P.C.; Douglas W. Sprinkle

(57) ABSTRACT

A wastewater treatment system includes an outlet barrier for controlling a flow of wastewater from a treatment zone to an outlet from the wastewater environment. An immersed support structure is disposed in the treatment zone for supporting aquatic plants in the wastewater environment. The support structure has adjustable buoyancy such that a position of the support structure relative to the upper surface of the wastewater in the treatment zone may be adjusted by adjusting the buoyancy of the support structure.

21 Claims, 10 Drawing Sheets

(56) References Cited

U.S. PATENT DOCUMENTS

| | | |
|---|---|---|
| 5,393,426 A | 2/1995 | Raskin et al. |
| 5,528,856 A | 6/1996 | Smith et al. |
| 5,636,472 A | 6/1997 | Spira et al. |
| 5,766,474 A | 6/1998 | Smith et al. |
| 5,799,440 A | 9/1998 | Ishikawa et al. |
| 5,836,108 A | 11/1998 | Scheuer |
| 5,980,738 A | 11/1999 | Heitkamp et al. |
| 6,014,838 A | 1/2000 | Asher |
| 6,056,476 A | 5/2000 | Streichenberger |
| 6,070,537 A | 6/2000 | Anderson et al. |
| 6,086,755 A | 7/2000 | Tepper |
| 6,200,469 B1 | 3/2001 | Wallace |
| 6,322,699 B1 | 11/2001 | Fernandez |
| 6,555,219 B2 | 4/2003 | Kosinski |
| 6,615,539 B1 | 9/2003 | Obonai et al. |
| 6,652,743 B2 | 11/2003 | Wallace et al. |
| 6,751,903 B2 | 6/2004 | Shryock |
| 6,843,021 B1 | 1/2005 | Huang |
| 7,074,330 B1 | 7/2006 | DeBusk |
| 7,314,562 B2 | 1/2008 | Svirklys et al. |
| 7,632,407 B1 | 12/2009 | DeBusk |
| 7,718,062 B2 | 5/2010 | Bauer et al. |
| 7,718,063 B2 | 5/2010 | Jacquet |
| 7,754,079 B2 | 7/2010 | Bauer |
| 7,776,216 B1 | 8/2010 | Jensen et al. |
| 7,790,032 B2 | 9/2010 | Ogden |
| 8,092,679 B1 | 1/2012 | Jensen et al. |
| 8,132,364 B2 | 3/2012 | Kania et al. |
| 2003/0051398 A1 | 3/2003 | Kosinski |
| 2003/0208954 A1 | 11/2003 | Bulk |
| 2005/0183331 A1 | 8/2005 | Kania et al. |

FOREIGN PATENT DOCUMENTS

| | | |
|---|---|---|
| RU | 2262488 C1 | 10/2005 |
| RU | 54937 U1 | 7/2006 |
| RU | 2397149 C1 | 8/2010 |
| SU | 1756288 A1 | 8/1992 |

* cited by examiner

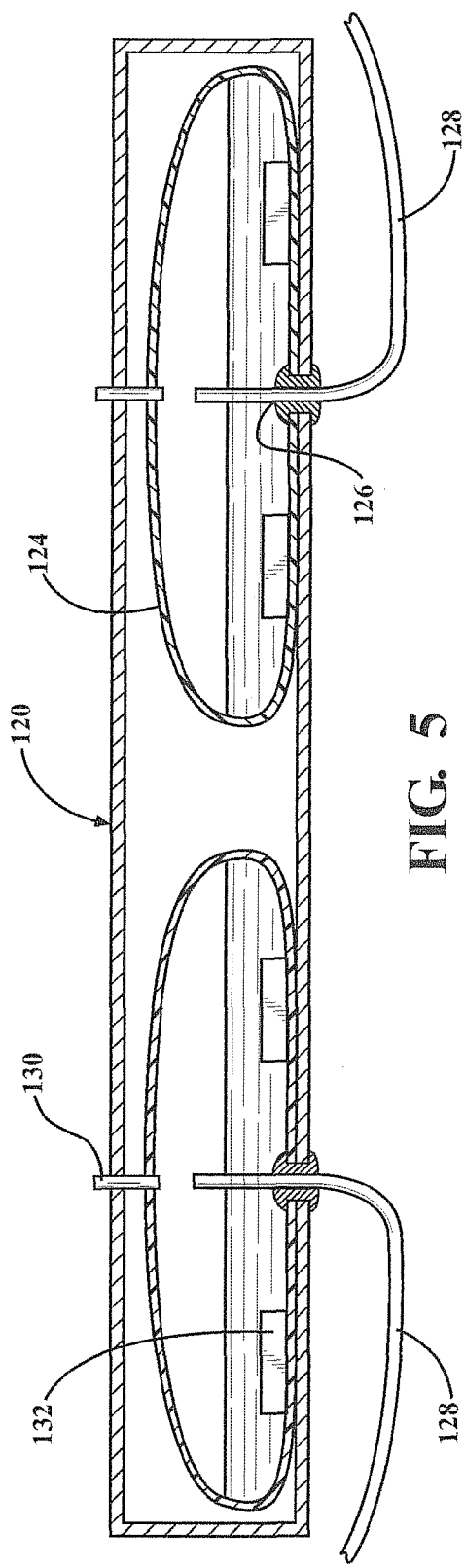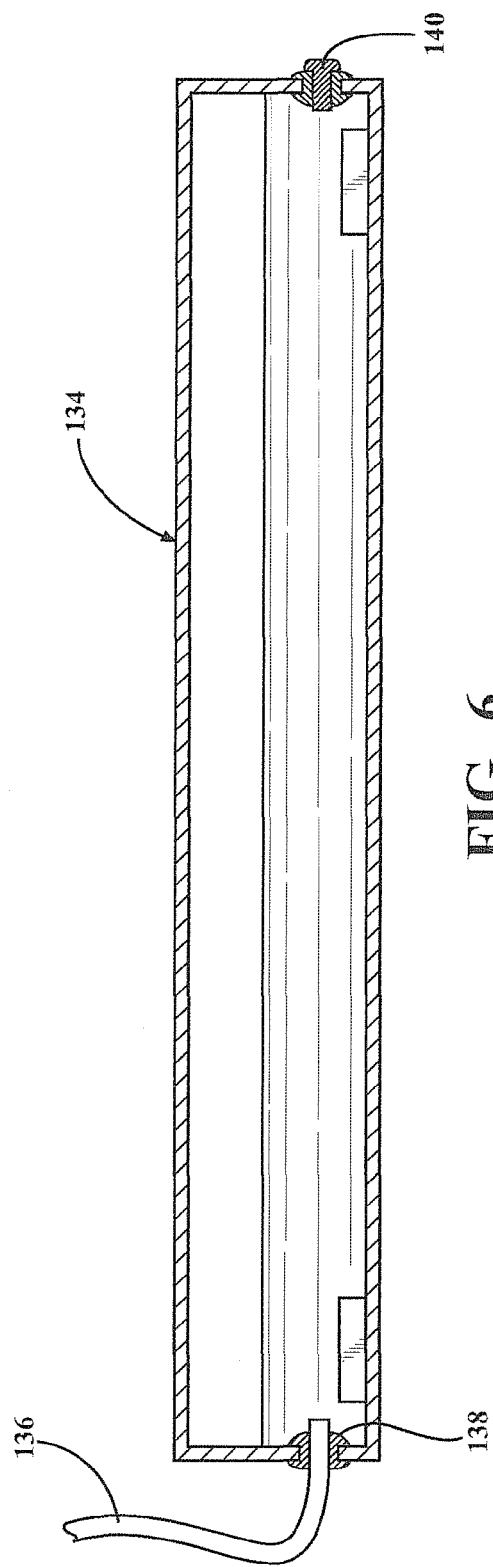

SYSTEM FOR WASTEWATER TREATMENT USING AQUATIC PLANTS

CROSS-REFERENCE TO RELATED APPLICATIONS

This application claims priority of U.S. Provisional Application 61/754,742 filed Jan. 21, 2013, the contents of which are incorporated herein by reference.

FIELD OF THE INVENTION

The present invention relates generally to the treatment of wastewater and, more specifically, to the treatment of wastewater using aquatic plants supported by support structures in a wastewater environment.

BACKGROUND OF THE INVENTION

State-of-the-art wastewater treating operations work in three stages. In the first stage solid waste materials are separated from the water and in the other two stages oxygen is injected into wastewater for bacteria to metabolize the waste therein. These two latter stages require technologies that are expensive to install, difficult to maintain and expensive to operate because they are energy intensive. To combat the rising energy costs associated with conventional wastewater treatment, "Wetland" treatment technologies have been applying the inherent ability of aquatic macrophyte plants to oxygenate their immediate aqueous environment stimulating the metabolism of waste-consuming bacteria to do the same work as they do in conventional facilities using nothing more than the sun's energy and a little wind. These technologies capitalize on this simple and "free" phenomenon to treat wastewater with the same efficacy as conventional wastewater treatment facilities with virtually no operating costs. However, "Wetland" projects have several significant drawbacks since they require very large tracts of land and the porous substances making up the filters of the treatment ponds may become saturated with unprocessed waste requiring their replacement or prolonged recycle times for the entire facility. More importantly, these projects have no way to regulate the amount of time wastewater is exposed to waste consuming bacteria in an oxygenated environment, and, at times such as after an intense rain storm, can let insufficiently treated effluent pass through the facility.

Research related to "Wetland" treatment processes has been found emergent macrophyte varieties are extremely efficient in transmitting the air from the wind flowing through their canopies to their roots and rhizomes making them ideal for oxygenating wastewater. These plants have been found to naturally form "mats" on the surface of water and that these formations injected very large amounts of oxygen into the water without establishing roots in the sediments. In nature these "mats" form when individual groups of plants break away from the plant colonies near the shores and float on the surface because of the gas spaces in their rhizomes and the decomposing dead plants in the mat. Thus, amongst the patents related to the formation of "floating mats", U.S. Pat. Nos. 5,799,440; 6,322,699; 7,776,261; and 8,250,808 stand out as providing the means of emulating a process that occurs in nature. These approaches to the formation of "mats" usually establish a certain amount of young plants upon floating devices and let them reproduce till a "floating mat" is formed. Although this approach requires much less space than conventional "Wetland" projects do, because they create very dense "mats" some wastewater usually flows underneath these without being evenly exposed to the waste-consuming bacteria.

SUMMARY OF THE INVENTION

The present invention provides various embodiments of systems and methods for the treatment of wastewater using aquatic plants. In one embodiment, a system is provided for use in a wastewater environment having an inlet, an outlet, and a treatment zone extending between the inlet and outlet. Wastewater is disposed in the treatment zone and flows into the treatment zone from the inlet and out of the treatment zone from the outlet. The system includes an outlet barrier for controlling a flow of wastewater from a treatment zone to an outlet from the wastewater environment. The outlet barrier structure includes a base having a lower portion disposed on a bottom of the wastewater environment adjacent the outlet and a guide portion extending upwardly therefrom. The base has negative buoyancy. An upper portion movably engages the guide portion of the base and has a top edge. The upper portion has adjustable buoyancy such that a position of the upper portion relative to an upper surface of the wastewater at the outlet may be adjusted by adjusting the buoyancy of the upper portion. The system also includes at least one immersed support structure with adjustable buoyancy for supporting aquatic plants in the wastewater environment. The support structure is disposed in the wastewater in the treatment zone and includes a support frame and a plurality of plant holders. Each plant holder has a plant receiving area and is interconnected with the support frame such that some of the plant holders are disposed at a first vertical position and others of the plant holders are disposed at a second vertical position. The support structure has adjustable buoyancy such that a position of the support structure relative to the upper surface of the wastewater in the treatment zone may be adjusted by adjusting the buoyancy of the support structure. As such, some of the plant holders are positioned at a first depth and others of the plant holders are disposed at a second depth with respect to the upper surface of the wastewater.

In some versions, the support structure has an upper region and a lower region and a buoyancy chamber defined in the support structure. An air inlet is in fluid communication with the buoyancy chamber such that air is injected through the air inlet to increase the buoyancy of the support structure. The air inlet may be disposed in the upper region of the support structure and the support structure may further have a water outlet in the lower region. In this version, the water outlet is in fluid communication with the buoyancy chamber such that as air is injected into the buoyancy chamber, water is displaced through the water outlet; and as air is removed from the buoyancy chamber, water flows into the buoyancy chamber from the water outlet.

In another version, the air inlet is an opening in the lower region of the support structure and the opening is in fluid communication with the buoyancy chamber such that as air is injected into the buoyancy chamber, water is displaced through the opening; and as air is removed from the buoyancy chamber, water flows into the buoyancy chamber from the opening.

In some versions, the support structure has a liquid inlet, a plurality of liquid outlets, and a liquid passage connecting the liquid inlet with the plurality of liquid outlets. The liquid outlets are located such that liquid provided through the liquid inlet is distributed through the plurality of outlets to the wastewater environment. The support structure may have a buoyancy chamber defined therein with the chamber defining part of the liquid passage such that liquid provided through the liquid inlet flows through the buoyancy chamber. The support structure may further have an air supply tube or an air valve in fluid communication with the buoyancy chamber for adjusting a quantity of air in the buoyancy chamber and thereby adjusting the buoyancy of the support structure.

In some versions, the system includes at least a second support structure for supporting aquatic plants in the wastewater environment. The support structure includes four elongated support members interconnected to form a generally rectangular perimeter. A plurality of plant holders are interconnected with the support members, and each plant holder has a plant receiving area.

In some versions, the system includes a first plurality of aquatic plants disposed on some of the plant supports and a second plurality of aquatic plants disposed on others of the plant supports. The first plurality and second plurality of aquatic plants are different categories of aquatic plants, with the categories being selected from the group of categories consisting of emergent macrophytes, floating leaf macrophytes, and submerged leaf macrophytes.

In some versions, the system further includes an inlet barrier structure for controlling a flow of water into the treatment zone. The inlet barrier structure includes a base having a lower portion disposed on a bottom of the wastewater environment adjacent the inlet and a guide portion extending upwardly therefrom. The base has negative buoyancy. An upper portion is movably engaged with the guide portion of the base. The upper portion has a top edge. The upper portion has adjustable buoyancy such that a position of the upper portion relative to an upper surface of the wastewater at the inlet may be adjusted by adjusting the buoyancy of the upper portion. The inlet barrier system may include a skimmer element interconnected with the upper portion and spaced from the top edge. The skimmer element may be disposed at the upper surface of the wastewater. The upper portions of the inlet and outlet barrier structures may each have a buoyancy chamber defined therein and an air inlet in fluid communication with the buoyancy chamber. The buoyancy of the upper portions may be adjusted by adjusting the quantity of air in the buoyancy chambers. The barrier structures may each further include a motor operable to move the upper portion relative to the base.

In some versions, a skirt element is interconnected with the support structure and extends downwardly therefrom. The skirt element defines a barrier for directing the flow of wastewater relative to the support structure.

In some versions, the system further includes an anchoring system for maintaining a position of the support structure. The anchoring system includes a plurality of anchoring elements each including a foot disposed on the bottom of the treatment zone and a post extending upwardly therefrom. The support structure includes a plurality of guides attached thereto. The guides each slidably receive a post such that the support structure slides upwardly and downwardly on the posts as the level of wastewater changes.

In some versions, the barrier structure further includes a pair of lateral supports disposed at opposite ends of the upper portion and extending downwardly to the bottom.

A second embodiment of the present invention provides a system for wastewater treatment using aquatic plants in a wastewater environment having an inlet, an outlet, and a treatment zone extending between the inlet and outlet. Wastewater is disposed in the treatment zone and flows into the treatment zone from the inlet and out of the treatment zone from the outlet. The system includes a plurality of immersed adjustably buoyant support structures for supporting aquatic plants in the wastewater environment. Each structure is disposed in the wastewater in the treatment zone. Each support structure includes a support frame having a buoyancy chamber defined therein. An air inlet is in fluid communication with the buoyancy chamber for adjusting the quantity of air in the buoyancy chamber, thereby adjusting the buoyancy of the support structure. A plurality of plant holders each have a plant receiving area and are interconnected with the support frame. The system further includes a plurality of skirt elements each comprising a barrier with an upper end and a lower part extending downwardly towards a bottom of the treatment zone such that a flow of wastewater is redirected by each skirt element. A first plurality of aquatic plants is disposed on some of the plant supports, with the plants being selected from the group of categories consisting of emergent macrophytes, floating leaf macrophytes, and submerged leaf macrophytes. The buoyancy of the support structures is adjusted such that each support structure is submerged in the wastewater and the support structure and plants are neutrally buoyant in the wastewater in the treatment zone.

In some versions, the system further includes an outlet barrier structure for controlling the flow of wastewater from a treatment zone to an outlet. The outlet barrier structure includes a base having a lower portion disposed on a bottom of the wastewater environment adjacent the outlet and a guide portion extending upwardly therefrom. The base has negative buoyancy. An upper portion is movably engaged with the guide portion of the base. The upper portion has a top edge. The upper portion has adjustable buoyancy such that a position of the upper portion relative to the upper surface of the wastewater at the outlet may be adjusted by adjusting the buoyancy of the upper portion.

In some versions, the buoyancy of the support structures is adjusted such that some of the support structures are disposed at a first position relative to an upper surface of the wastewater and others of the support structures are disposed at a second position relative to the upper surface of the wastewater. The system further includes a second plurality of aquatic plants, the second plurality of aquatic plants being a different category of plant from the first plurality of plants. The system further includes an anchoring system for maintaining a position of each support structure. The anchoring system includes a plurality of anchoring elements each including a foot disposed on the bottom of the treatment zone and a post extending upwardly therefrom. The support structures each further include a plurality of guides attached thereto. The guides each slidably receive a post such that the support structures slide upwardly and downwardly on the post as the level of wastewater changes. Some of the plants supported by the holders are positioned at a first depth and others of the plants are disposed at a second depth with respect to the upper surface of the wastewater.

The present invention also provides a method of wastewater treatment using aquatic plants. The method provides a plurality of support structures each having support elements and a plurality of plant holders interconnected with the support elements. The plant holders each have a plant receiving area. The plurality of support structures include at least a first group of support structures and a second group of support structures. A first plurality of aquatic plants are provided and disposed on plant holders of the first group of the support structures. A second plurality of aquatic plants is provided and the bases of the plants are disposed on plant holders of the second group of the support structures. The first plurality and second plurality of aquatic plants are different categories of aquatic plants. The categories are selected from the group of categories consisting of emergent macrophytes, floating leaf macrophytes, and submerged leaf macrophytes. The support structures are disposed in the wastewater environment. The buoyancy of the support structures is adjusted such that each support structure with its respective plants has a generally neutral buoyancy and is immersed in the wastewater environment. The buoyancy being adjusted such that the first group of support structures is at a first depth with respect to the upper surface and the second group of support structures is at a second depth with respect to the upper surface. As such, the first plurality of aquatic plants are adjacent the surface of the wastewater environment and the bases of the second plurality of aquatic plants are submerged.

In some versions, each support structure includes a buoyancy chamber and an air inlet in fluid communication with the buoyancy chamber. The buoyancy adjusting step comprises adjusting the quantity of air in the buoyancy chamber.

In some versions, the support structure includes a liquid inlet and a plurality of liquid outlets. A liquid passage connects the liquid inlet with the plurality of liquid outlets. The liquid outlets being located such that liquid provided through the liquid inlet is distributed through the plurality of outlets to the wastewater environment. The method further includes distributing nutrients or bacteria to the wastewater environment by providing a liquid containing such nutrients or bacteria through the liquid inlet.

BRIEF DESCRIPTION OF THE DRAWINGS

FIG. 5 is a cross-sectional view of a portion of a support structure showing one approach to providing buoyancy chambers therein;

FIG. 6 is a cross-sectional view of an alternative approach to providing buoyancy chambers in a support structure;

DETAILED DESCRIPTION OF THE PREFERRED EMBODIMENTS

Figure 1:
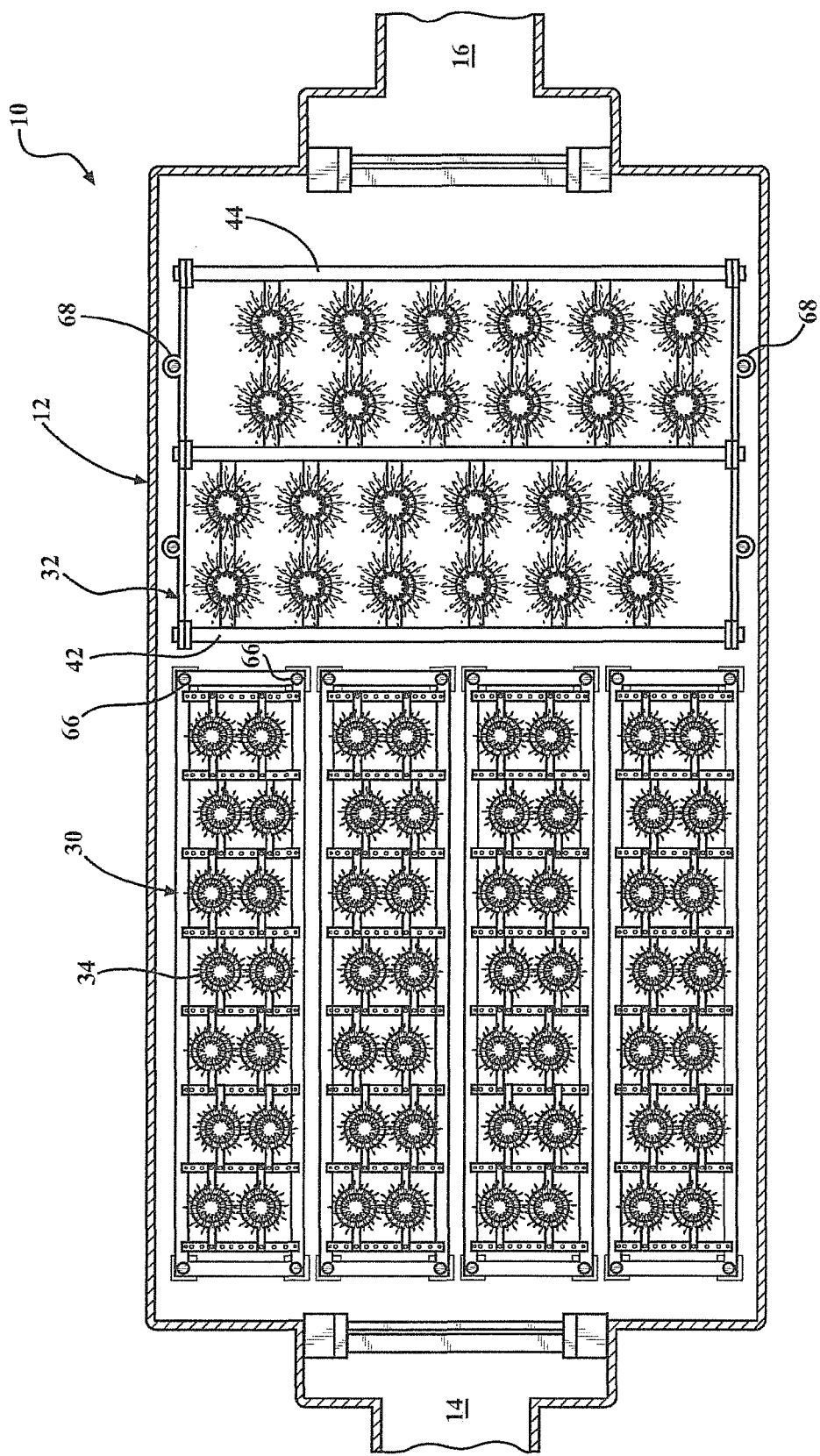
FIG. 1 is a top view of a wastewater environment with a wastewater treatment system in accordance with an embodiment of the present invention located therein.

The present invention provides several systems and methods for the treatment of wastewater using aquatic plants. To obtain the maximum benefits from aquatic plants in a wastewater treatment process, a judicious mix of emergent, floating and submerged species are used wherever possible. Emergent plants with an internal convective through-flow ventilation system have higher internal oxygen concentrations in the rhizomes and roots than other species and are the species of choice for the treatment of wastewater by being positioned to establish a mat upon the surface of the wastewater. These species of plants are at their utmost metabolic performance in an aqueous environment with their root systems being several centimeters above the surface of the water to a depth of about one 1.5 meters. Broad leafed floating macrophytes, with roots usually located between 50 cm. and three meters of depth, do not inject much oxygen into their environment but by being interspersed between emergent macrophyte populations can provide a good ventilation system to guarantee adjacent emergent plants are evenly exposed to the necessary wind gradients required for them to push the optimum amount of oxygen into their roots and rhizomes. Submerged-leaf macrophytes, which grow from the shallowest zones to about 9 meters, may be used for two purposes. First, since these plants do not interface with the air above the water, their leaves pick up substances in the body of water and may therefore be advantageously used as low-cost indicators to monitor the condition of the treated waters in terms of organic and inorganic substances at different depths. Secondly, these plants can grow in an anaerobic zone of a body of wastewater and provide anaerobic bacteria a support upon which they can attach and become more productive in the decomposition of sludge residing in this zone. Thus, by interspersing these three types of aquatic plants in a body of wastewater and staggering the depths at which these plants are grown, a homogeneously oxygen rich environment may be created for the bacteria to thrive.

Over two thousand years ago Archimedes discovered that objects in liquids are buoyed up by a force that is equal to the weight of the water they displace. Thus, there are three types of buoyancy. When an object displaces a greater weight of liquid than the object weighs, the object is said to be less dense than the liquid and have positive buoyancy, making it float. If an object displaces a lesser weight of liquid than the object weighs, the object is said to be denser than water and have negative buoyancy, which will make it sink. And if a body has a weight and density between the first two, it is said to have neutral buoyancy and it will stay at a given depth relative to the surface of the liquid. Embodiments of the present invention make use of neutral buoyancy in much the same way as submarines do. By accurately adjusting the density of a structure, the structure can remain at any level in a body of water without undue stress which may distort or damage it over time.

Figure 2:
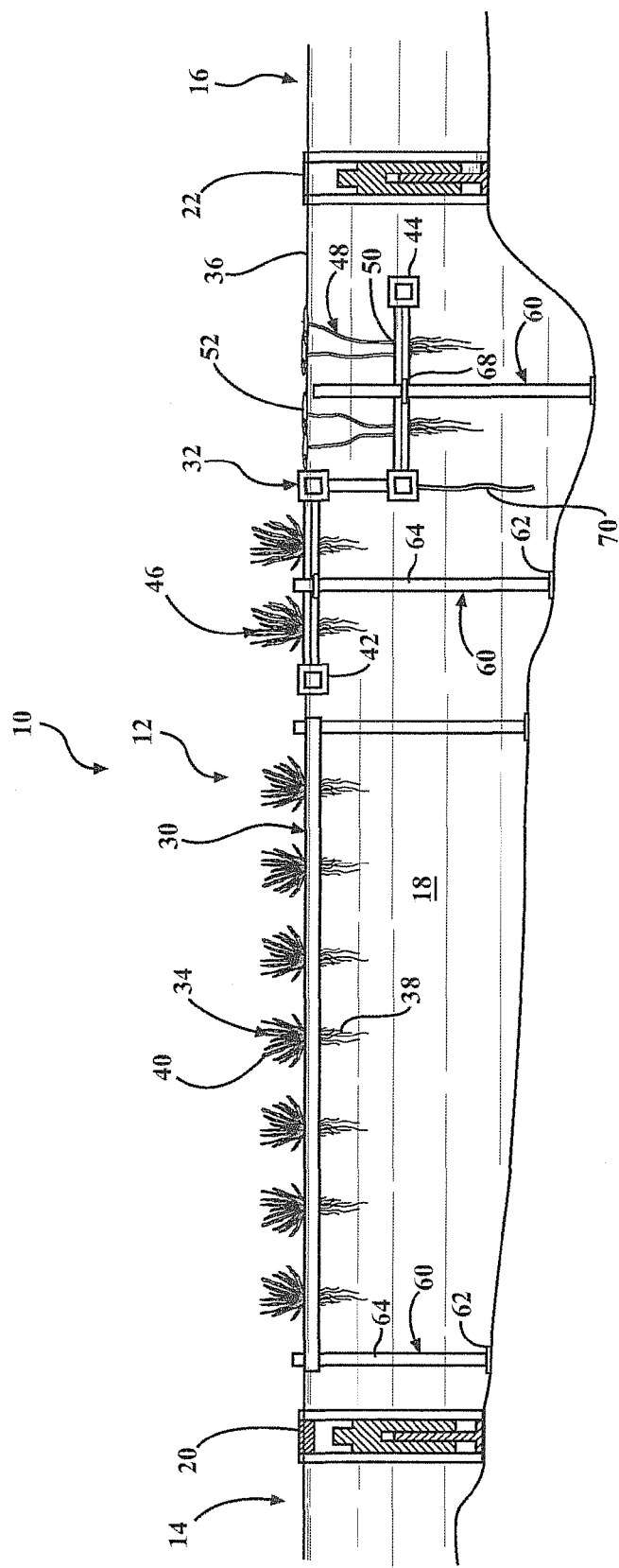
FIG. 2 is a cross-sectional side view of the wastewater environment and wastewater treatment system of FIG. 1.

Referring to FIGS. 1 and 2, an exemplary wastewater environment is shown at 10, including a treatment zone 12, an inlet 14, and an outlet 16. The wastewater environment is filled with wastewater 18. Wastewater is allowed to flow from the inlet 14 into the treatment zone 12, where the wastewater 18 preferably remains for a desired treatment period sufficient to allow cleaning of the wastewater. After treatment, wastewater 18 is allowed to flow out through the outlet 16. From there, it may flow to an area for additional treatment or be returned to the environment.

In order to control the flow of wastewater from the inlet 14 into the treatment zone 12, systems in accordance with the present invention may include an inlet barrier structure 20 located adjacent the inlet 14. The inlet barrier structure may limit the flow of wastewater into the treatment zone and/or limit the backflow of wastewater from the treatment zone into the inlet. Systems in accordance with the present invention may also include an outlet barrier structure 22 located adjacent the outlet 16. The outlet barrier structure 22 may limit the flow of wastewater from the treatment zone 12 to the outlet 16 and/or limit the backflow of wastewater from the outlet to the treatment zone.

Some embodiments of the present invention may include both inlet and outlet barrier structures, while other embodiments include neither, and yet others include only an outlet barrier structure or an inlet barrier structure, depending on the characteristics and design of the wastewater treatment system. Certain embodiments may have treatment zones arranged in series with a barrier structure therebetween. In this case, the barrier structure may serve as both an outlet barrier structure (from the first treatment zone) and an inlet barrier structure (to the next treatment zone).

A plurality of support structures are disposed in the wastewater 18 in the treatment zone 12. FIGS. 1 and 2 illustrate two styles of support structure. A first generally rectangular style support structure is shown at 30 and a second two-level support structure is shown at 32. These styles are exemplary, and additional styles may be provided. The support structure 30 is generally planar and supports a plurality of aquatic plants 34 all at approximately the same level, such that all of the plants 34 are disposed at approximately the same position relative to the upper surface 36 of the wastewater 18. The aquatic plants 34 represent a type of plant defined as emergent macrophytes. As shown, the macrophytes are positioned such that the roots 38 are submerged and the upper portion 40 of the plants 34 are above the upper surface of the water.

The illustrated second style support structure 32 has a first portion 42 disposed at a first level and a second portion 44 disposed at a second level with respect to the upper surface 36 of the wastewater 18. A first group of aquatic plants 46 is supported on the first portion 42 and a second group of aquatic plants 48 is supported on the second portion 44. In the illustration, the plants 46 are of the same type as the plants 34 and are positioned at a similar level or depth with respect to the upper surface 36. The plants 48 are floating leaf macrophytes and have a base 50 that is supported by the second portion 44 of the support structure 32 and leaves 52 that float on the upper surface 36.

The illustrated embodiment of the system also includes an anchoring system for maintaining the positions of the supports structures 30 and 32 within the treatment zone, so that they do not float around. The anchoring system includes a plurality of anchoring elements 60. These anchoring elements may take a variety of forms, but preferably allow the support structures to move upwardly and downwardly as the quantity of wastewater in the treatment zone changes while preventing the structures from moving too much side-to-side or front-to-back in the treatment zone 12. The illustrated anchoring elements include a foot 62 disposed on the bottom of the treatment zone and a post 64 extending upwardly therefrom. The posts 64 are received in guides on the support structures such that the guides slide upwardly and downwardly on the posts as the level of wastewater changes. In FIG. 1, the guides for the support structures 30 are openings in the support structures with the posts extending through the openings. The guides for the support structure 32 take the form of rings 68 attached to the outside of the support structure, with the posts extending through the rings. As will be clear to those of skill in the art, the guides and anchoring elements may take a variety of other forms.

In accordance with the present invention, each of the support structures preferably has adjustable buoyancy. This allows the buoyancy of the structure, with its associated aquatic plants, to be adjusted to obtain a desired buoyancy. In preferred versions, the buoyancy is adjusted to make the structures, with plants, neutrally buoyant in the particular wastewater environment at a chosen position relative to the upper surface. As known to those of skill in the art, the density of the wastewater may vary, depending on its characteristics. It is preferred that the buoyancy of the structures be adjusted to reach a neutral buoyancy and to establish a desired position or depth of a particular support structure to place the plants at a desired position and to obtain the desired performance of the wastewater treatment system.

Most wastewater treatment facilities are dimensioned on the basis of a given amount of influent wastewater with a given amount of organic and inorganic content to be treated in a given amount of time to obtain an effluent of the desired quality. However, after an intense rainstorm, or unanticipated changes in quality of the wastewater (for example, caused by unanticipated discharges of concentrated wastes from local factories), the wastewater parameters used to dimension a facility may change drastically. To address these changes the present invention provides rising barrier structures, including the inlet barrier structure 20 and the outlet barrier structure 22. Under normal circumstances, these barrier structures are designed to let water pass over the top of the barrier, with the upper portion of each barrier structure in a lowered position. However, under circumstances caused by an intense rainstorm or a change in the amount, or quality, of the waste in the wastewater, the inlet and/or outlet barrier structures may be manually or electronically raised to a raised position, to retain water in the treatment zone and expose it to a longer period of bacterial action in a highly oxygenated environment. The present invention may also provide sediment removing structures that may also incrementally raise barriers to the effluent discharge increasing the amount of wastewater in the treatment area and simultaneously pump sediments out of the treatment area to be processed elsewhere providing more oxygen to the bacteria in the aerobic strata of the wastewater. Depending upon the embankment contours of the body of wastewater this increased holding time may easily be as much as 200% of that for which the project is dimensioned under normal operating conditions.

Some embodiments of the present invention may include a water barrier or skirt for directing the flow of wastewater relative to the support structures and plants. An exemplary skirt is shown at 70 in FIG. 2, attached to the support structure 32 and extending downwardly toward the bottom of the treatment zone. The skirt 32 is a generally planar piece of material that either resists or blocks the flow of wastewater. As such, wastewater is encouraged to flow upwardly to the plants 46 and 48. A skirt may be attached to a support structure, as shown, to portions of the anchoring system, or supported in other ways.

In other embodiments of the present invention, support structures may be provided in a different arrangement or different support structures may be used. As one example, generally planar support structures 30 may be disposed in a wastewater environment and the buoyancy adjusted such that the support structures are at different depths. Some may be immersed adjacent the upper surface as in FIG. 1 while others are submerged at different depths. Different types of aquatic plants may be provided on different support structures or mixed on some support structures. Aquatic plants may include emergent macrophytes for use adjacent the surface, floating leaf macrophytes with bases that are submerged and leaves that float, and submerged leaf macrophytes with leaves and bases that are submerged. As will be clear to those of skill in the art, these different types of plants may work best in the treatment of wastewater if they are located at different depths. The position of the support structures, and therefore the plants, may be adjusted to adjust the performance of the system. Support structures may be located at a single depth, two different depths, three different depths, or more.

Figure 3:
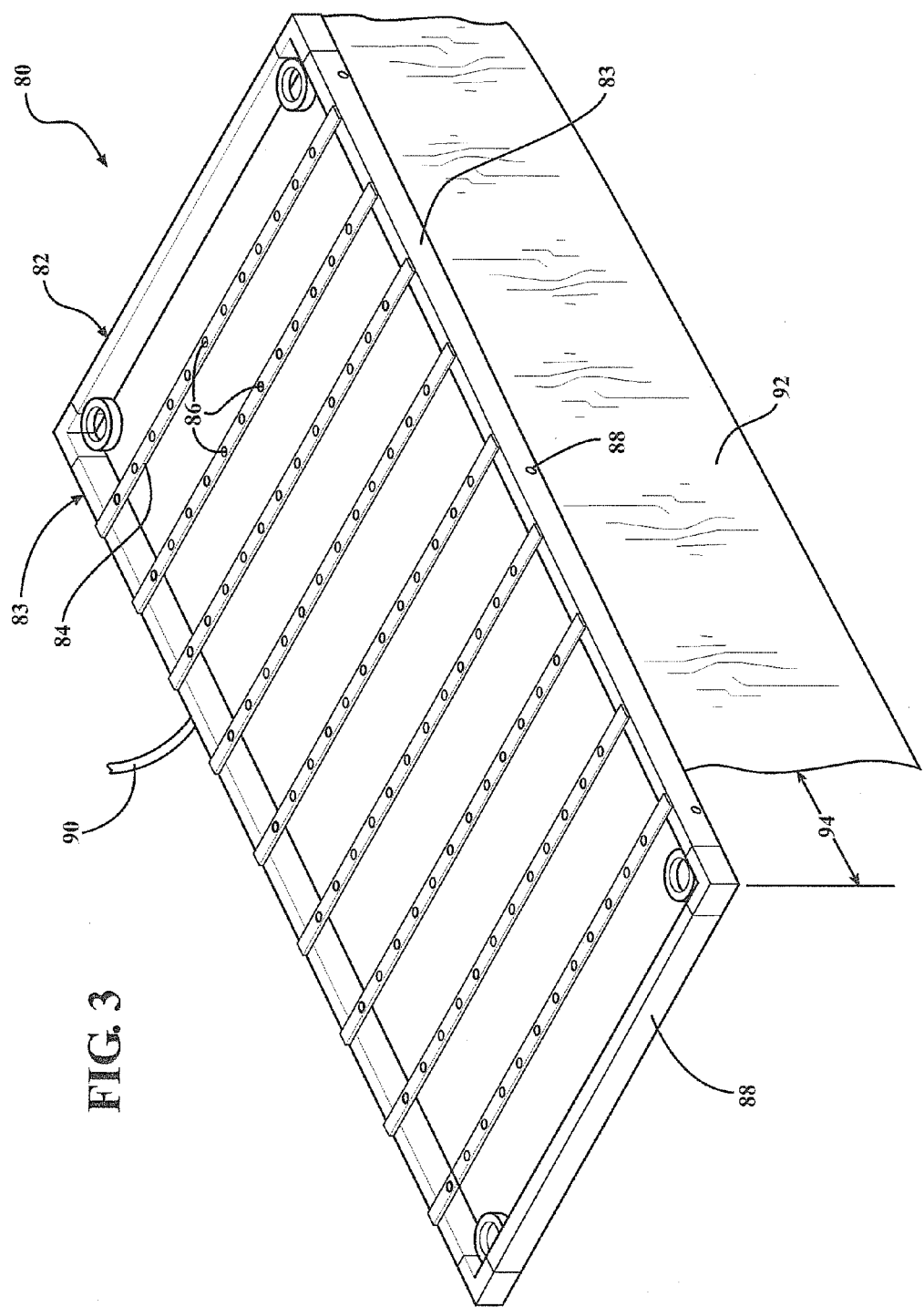
FIG. 3 is a perspective view of a version of a support structure for use with the present invention.

FIG. 3 illustrates an exemplary support structure 80 for use with the present invention. The support structure 80 includes a support frame 82 that, in this version, is rectangular and formed of four frame members 83. The frame members are preferably hollow tubular members, such as the rectangular tubing shown. Cross members 84 extend between the frame members 83. These cross members may serve as plant holders with a plurality of plant receiving areas 86. Alternatively, the cross members may support plant holders. For example, in FIG. 1, the support structure 30 is generally rectangular and has cross members that extend between opposed sides of the structure 30. Plant holders with plant receiving areas extend between the cross members.

Referring again to FIG. 3, the frame members 83 are shown with openings or holes 88 near their lower edge, distributed around the perimeter of the support frame 82. In this embodiment, the holes 88 communicate with the hollow interior of the support frame 82. If air is provided through the holes 88, the air will fill the upper part of the frame members 83, thereby increasing the buoyancy of the support structure. Alternatively, if air is removed, buoyancy is decreased. Also, if liquid is introduced through any of the holes 88, this liquid will flow through the frame members, which act as a liquid passage, and out of the other holes 88, serving as liquid outlets. As such, a liquid may be introduced into a liquid inlet hole for distribution to the wastewater surrounding the support structure. A hose 90 is shown connected to a liquid inlet on the back of the support structure 80. The hose 90 may be used to introduce air or liquid. Ballast may be attached to the support structure or disposed therein, such as metal plates or gravel inside the frame members 83, to balance the structure and help achieve a desired buoyancy level.

A skirt 92 is shown having an upper edge attached to the support structure 80 and a body that extends downwardly. In the illustrated version, the skirt extends from one end of the support structure part way to the other end, but leaves a gap 94 near one end. Alternatively, the skirt may have other sizes or configurations, such as extending the entire length. In one approach, support structures 80 are disposed such that their long dimension is generally perpendicular to the direction of wastewater flow in a treatment zone. By placing full-length skirts on the edge of each support structure, wastewater will be forced to interact with the plants. Further versions of skirts may have openings therein, such as openings adjacent the bottom of the support structure 80 so that wastewater flows up and passes just beneath the support structure. The support structures may be disposed at various depths.

Figure 4:
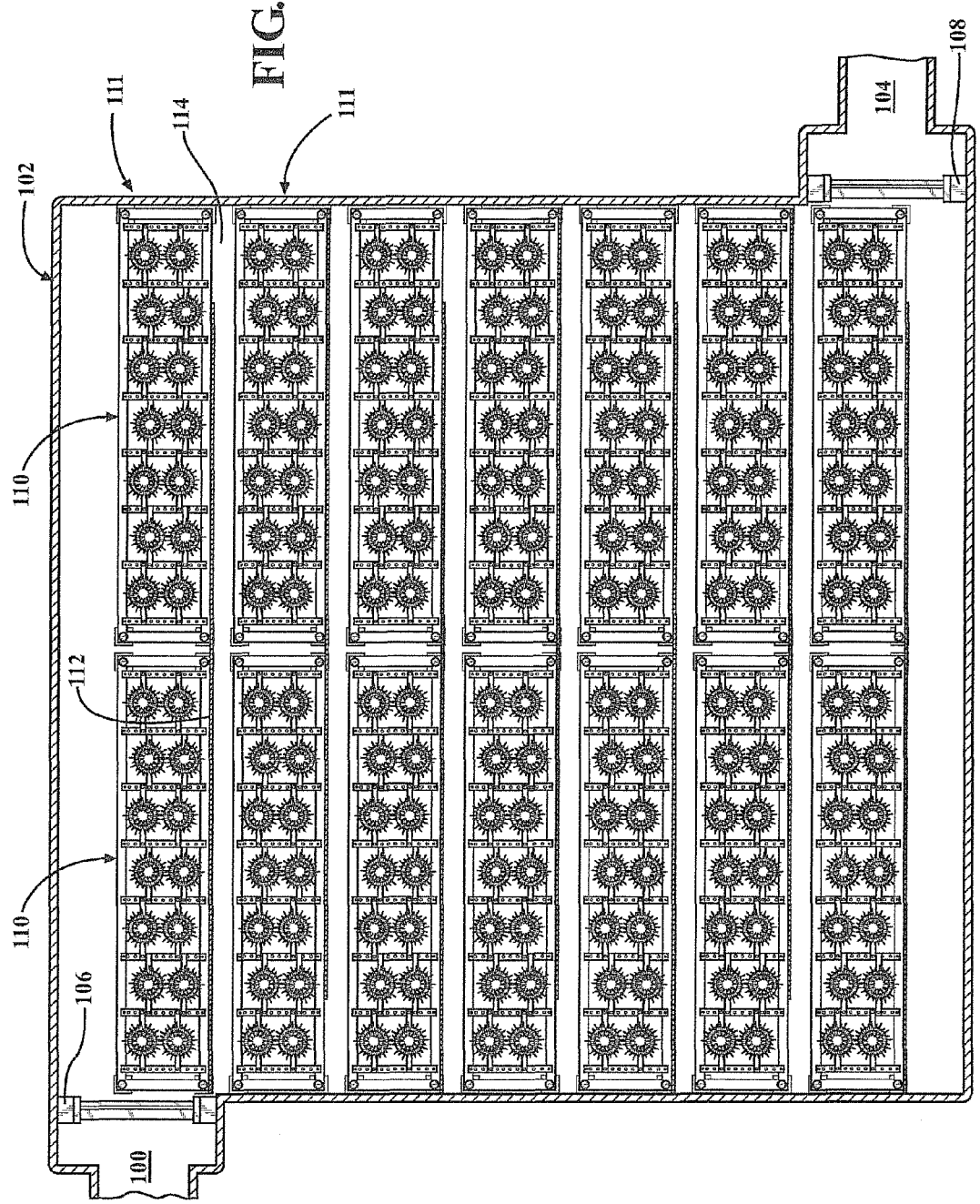
FIG. 4 is a top view of an alternatively configured wastewater environment with an alternative embodiment of a wastewater treatment system in accordance with the present invention located therein.

Referring now to FIG. 4, at alternative arrangement for a wastewater treatment system is illustrated. A wastewater environment has an inlet 100, a treatment zone 102 and an outlet 104. An inlet barrier structure 106 is disposed between the inlet 100 and treatment zone 102 and an outlet barrier structure 108 is disposed between the treatment zone 102 and outlet 104. A plurality of support structures 110 are disposed in the treatment zone 102, generally in a two by seven grid. Each support structure has a length and a width with the length being greater than the width. Two support structures are positioned end to end to provide an elongated row 111. In the illustrated embodiment, seven side by side rows 111 are provided. Skirts 112 are disposed between the rows 111 and may be attached to the support structures or supported in other ways. The skirts have a gap 114 near the end of each row, with the position of the gap alternating with each row. As such, the skirts define a flow path that zigzags back and forth, following the length of the rows and maximizing exposure of the wastewater to the plants. The system is illustrated as having a single type of plant, but multiple types may be used, and support structures may be provided at various depths.

As discussed above, support structures for use with the present invention preferably have adjustable buoyancy. FIG. 5 illustrates one approach to providing adjustable buoyancy. A frame member 120 of a support structure is shown in cross section. Two buoyancy chambers are shown disposed inside the frame member 120. Alternatively, they may be exterior to the frame member, shaped in other ways, or located differently. The area surrounding the chambers inside the frame member 120 may be filled with wastewater. The use of two buoyancy chambers in opposite ends of the frame member allows the buoyancy to be balanced end to end, since the weight of the plants on the support structure may be inconsistent, a skirt may be attached to one side, etc. A plurality of buoyancy chambers maybe provided, distributed in the support structure, to allow balancing. Alternatively, a single buoyancy chamber may be provided. In one example, the entire frame of the support structure acts as a buoyancy chamber.

In FIG. 5, the buoyancy chamber 124 is shown as having an opening 126 in its lower surface. Air may be added through this opening in order to increase buoyancy. In one approach, supply tube 128 extends through opening 126 and terminates adjacent the upper part of the chamber 122. Air may then be added or extracted through the tube 128 to adjust the buoyancy. As air is added or removed, wastewater flows in or out of the opening 126. In another approach, air is added through tube 128, which may terminate near the bottom of the chamber, but is removed through optional air valve, such as at 130. An air valve such as 130 may also be used to add air. An air tube may be attached to valve 130. A plurality of tubes may be provided to a plurality of buoyancy chambers to allow adjustment and tuning of buoyancy, even from a remote location. Depending on the natural (without added air) buoyancy of the support structure, ballast may be needed to avoid positive or excess buoyancy. Ballast plates 132 are shown in the chamber 122. They may alternatively be located outside the chamber, in or on the frame member or elsewhere. Ballast may be metal plates or other ballast material, such as gravel.

FIG. 6 illustrates an alternative approach to adjusting buoyancy in which a frame member 134 is filled partially with air and partially with water. A supply tube 136 communicates with an inlet 138. Air may be provided, which will displace water out an outlet 140. If liquid is provided through the inlet 138, this liquid will flow to the outlet 140. As discussed with respect to FIG. 3, this may be used to distribute nutrients or microbes to the wastewater surrounding the support structure. While the frame member 130 is shown as having a single chamber therein, it may alternatively have dividers to divide it into separate buoyancy chambers.

Figure 7:
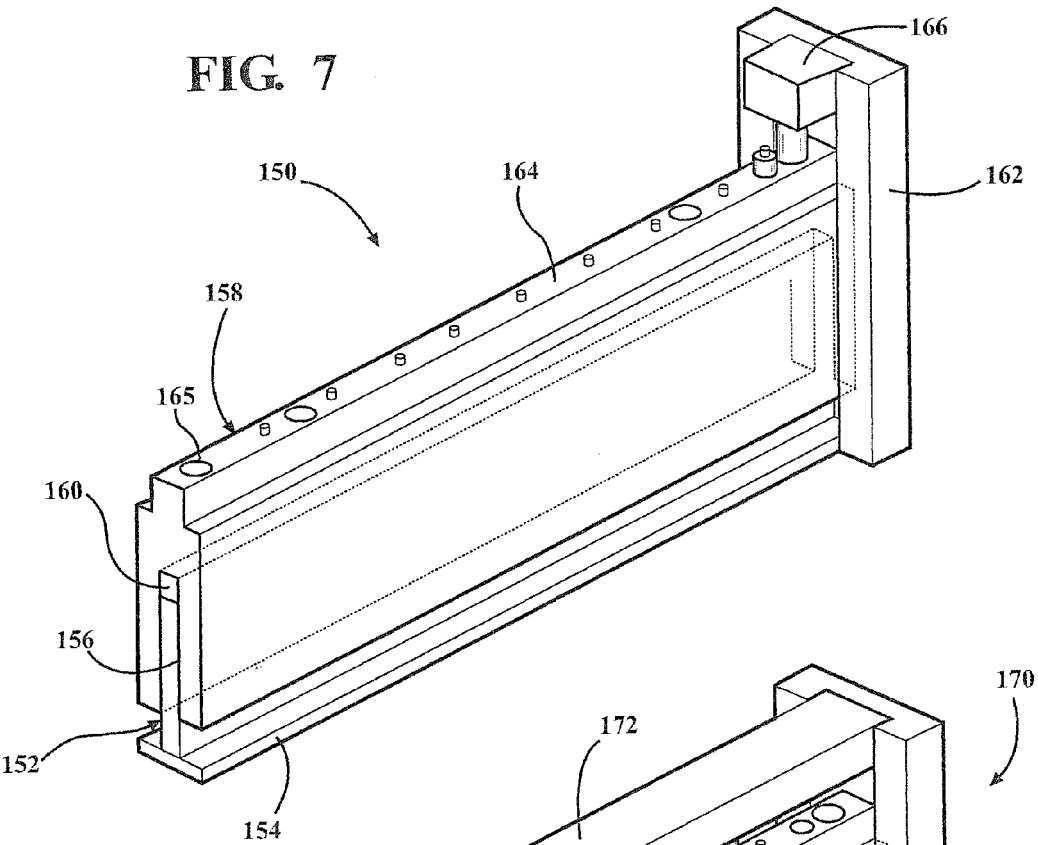
FIG. 7 is a perspective view of an embodiment of a barrier structure for use with the present invention.

As discussed with respect to FIG. 1, systems in accordance with the present invention may include inlet and/or outlet barrier structures. These may take a variety of forms. FIG. 7 illustrates an exemplary barrier structure 150. The structure includes a base 152 with a lower portion 154 to be disposed on the bottom of the treatment zone adjacent the inlet or outlet.

The base 152 includes a guide portion 156 that extends upwardly from the base 154. An upper portion 158 of the structure 150 movably engages the guide portion 156. A slot 160 in the underside of the upper portion 158 receives the guide portion. Pressure release holes 165 allow water to pass in and out of the slot 160 as the upper portion moves upwardly and downwardly. The base 154 and upper portion 158 cooperate to define a barrier limiting the passage of water. A lateral support 162 is disposed adjacent each end of the upper portion 158 for stabilizing and guiding the upper portion. In some embodiments, the upper portion has an adjustable buoyancy. The buoyancy may be adjusted such that the upper portion is neutrally buoyant with its upper edge 164 near or at the upper surface of the water. As such, the upper portion will move upwardly and downwardly with the level of wastewater. Its buoyancy may be tuned to allow a desired amount of water to flow past, and it will then self-regulate as the water level changes. The buoyancy adjustment may be accomplished in a variety of ways, including as illustrated in FIGS. 5 and 6. In one example, the upper portion is at least partially hollow and air is added or removed to adjust buoyancy. In another, a buoyancy chamber is provided either in or attached to the upper portion 158.

A motor 166 may be provided for raising or lowering the upper portion to increase or decrease the flow of water past the barrier. The motor may override the level of the upper portion due to buoyancy. The motor may be implemented in a number of ways.

Figure 8:
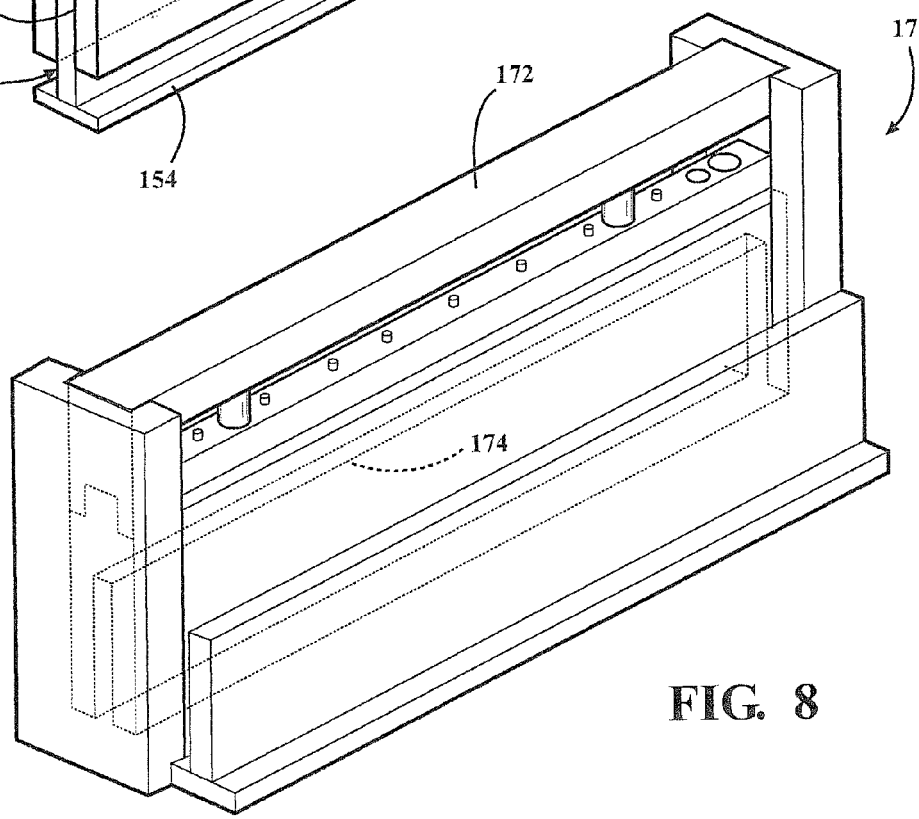
FIG. 8 is a perspective view of an alternative version of components of a barrier structure for use with the present invention.

Referring now to FIG. 8, an alternative barrier structure is shown at 170 with the base illustrated separately. This structure differs from the version in FIG. 7 in that a skimmer element 172 is interconnected with the upper portion 174 and spaced therefrom so as to define a slot therebetween. In use, the buoyancy of the upper portion 174 may be adjusted such that the skimmer element is at the surface. This blocks floating debris but allows water under the surface to flow through the slot under the skimmer element. In some versions of a wastewater treatment system in accordance with the present invention, a barrier structure with a skimmer is used at the inlet to prevent floating debris from entering the treatment zone. Though not shown, the barrier 170 may also include a motor for adjusting the position of the upper portion, and the motor may be implemented in a number of ways.

Figure 9:
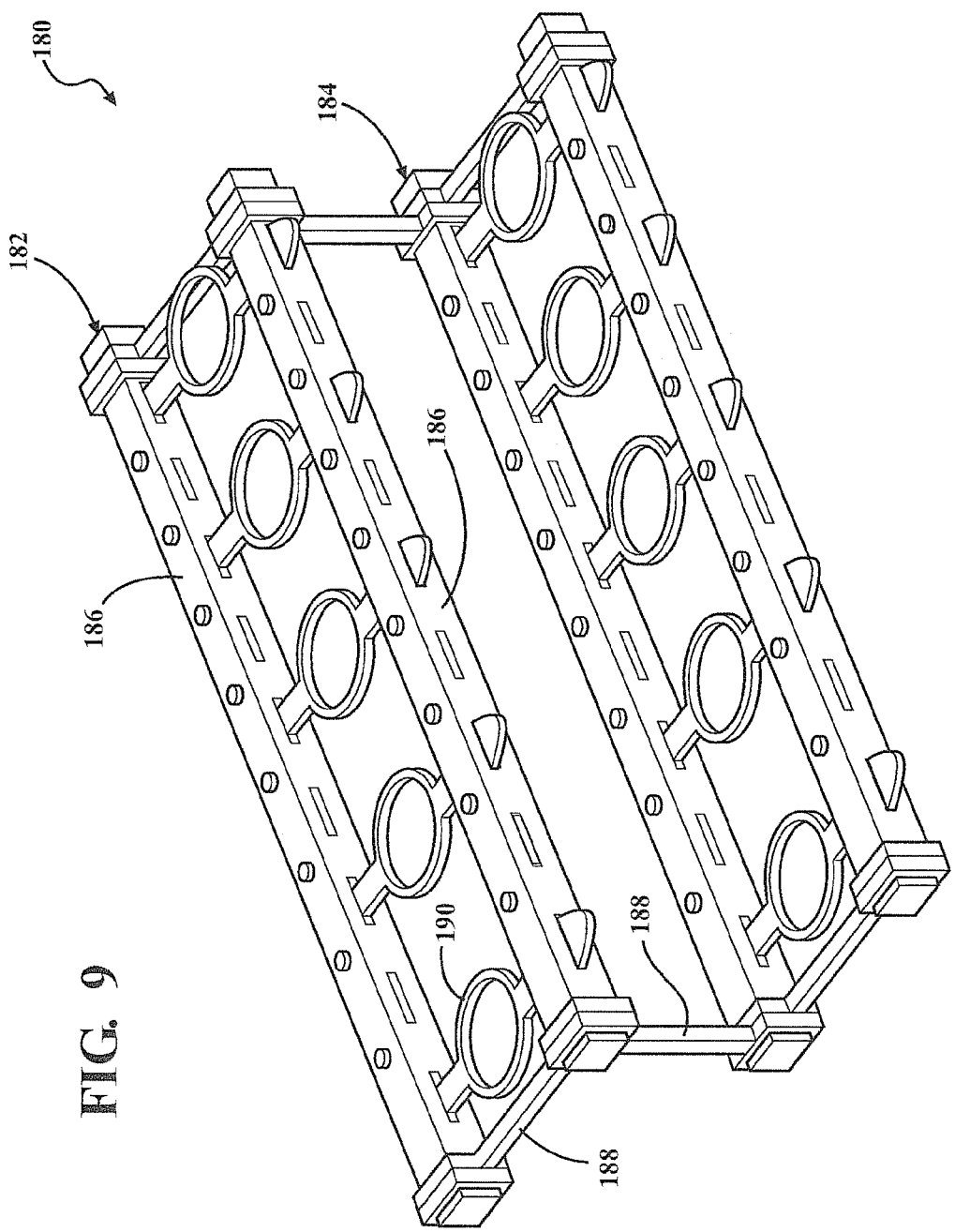
FIG. 9 is a perspective view of a modular support structure for use with the present invention.
Figure 10:
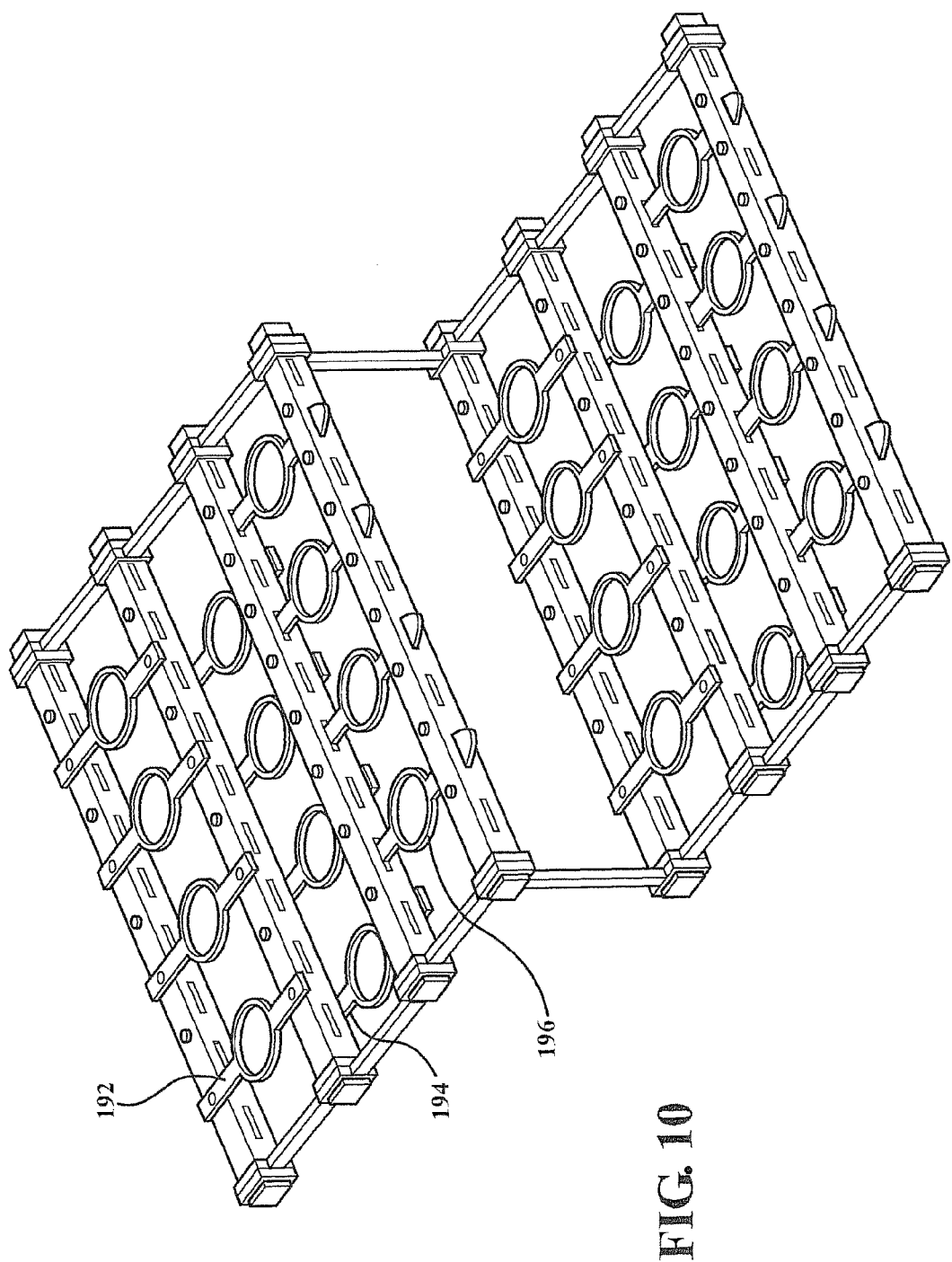
FIG. 10 is a perspective view of a modular support structure with the components arranged in a different manner.

FIG. 9 shows an alternative two-level support structure 180 having a first level 182 and a second level 184. The support structure 180 is constructed from elongated support elements 186 interconnected by cross members or links 188 and plant supports 190. As shown, the support elements 186 have a plurality of connection points or connection features engaged by the links and plant supports. The members and links may be arranged in various ways to provide various configurations. FIG. 10 shows an alternative version with a larger first and second level. Also, some plant supports 192 are interconnected with the upper sides of the support elements, other plant supports 194 are interconnected with the lower sides, and yet other plant supports 196 engaged the middle of the support elements. This allows plants to be at slightly different levels on the same level of the support structure.

Figures 11, 12, 13:
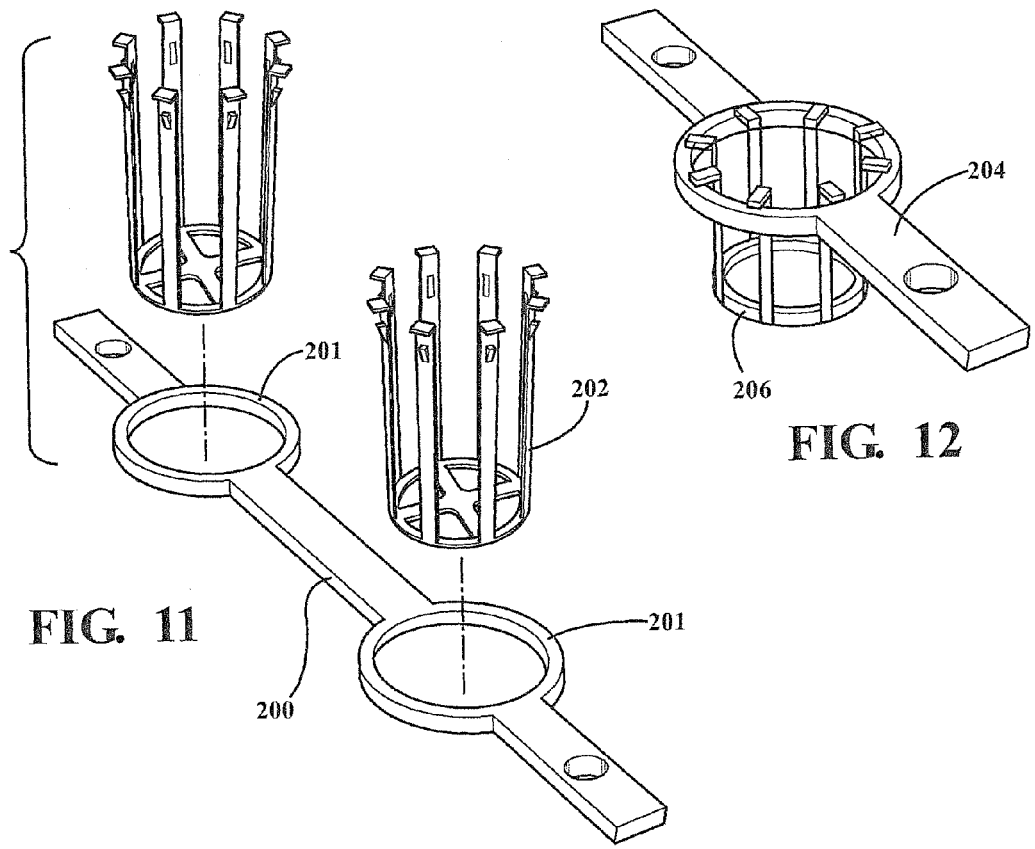
FIG. 11 is an exploded view of a cross member and two plant holders forming part of a modular support structure.
FIG. 12 is a perspective view of an alternative version of a cross member and plant holder.
FIG. 13 is a perspective view of an alternative version of a cross member.
Figure 14:
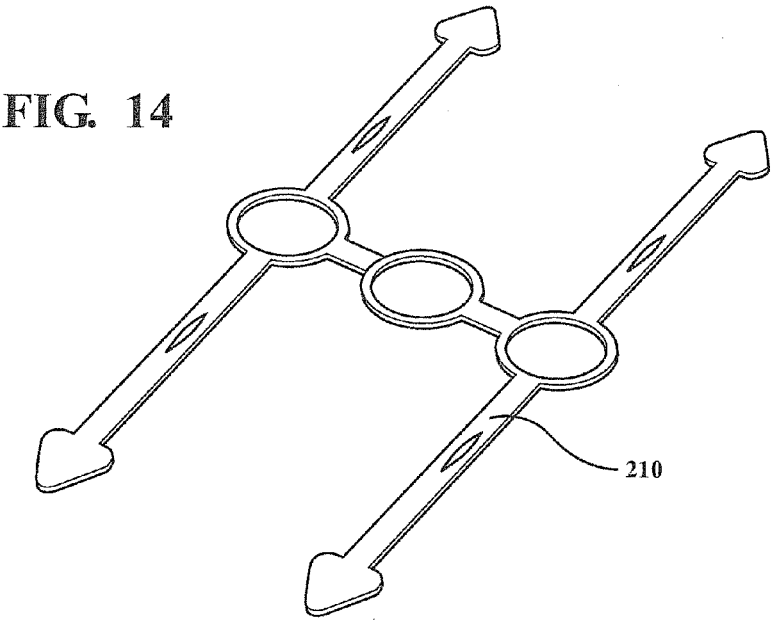
FIG. 14 is a perspective view of another version of a cross member.
Figure 15:
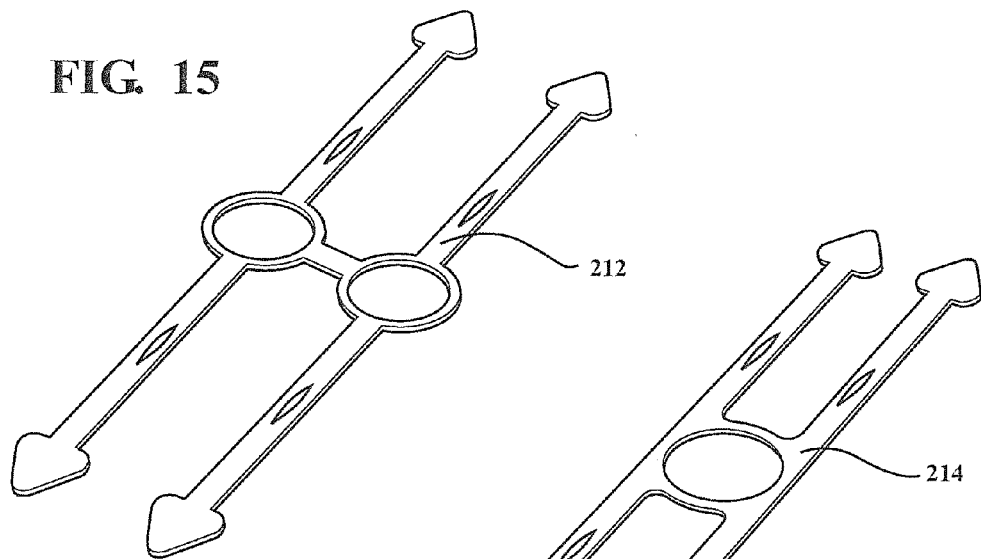
FIG. 15 is a perspective view of yet another version of a cross member.
Figure 16:
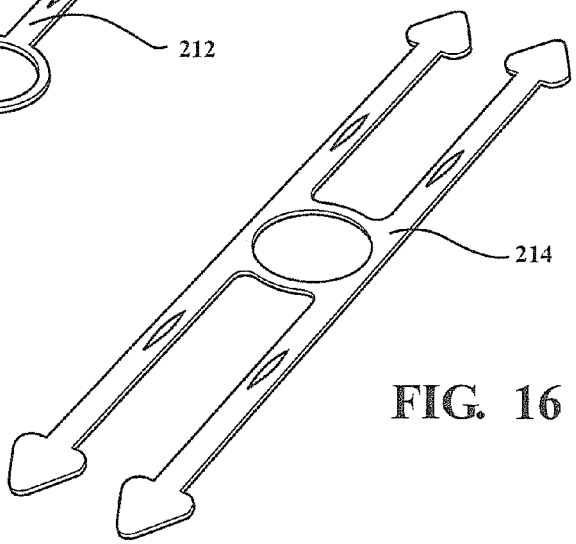
FIG. 16 is a perspective view of yet another version of a cross member.

FIG. 11 shows a plant support 200 for use with support structures. It has two plant receiving areas 201 and plant holders 202 that engage the receiving areas. As shown, the holders extend downwardly to allow the base of a plant to be positioned below the plant holder. FIG. 12 illustrates an alternative shorter plant support 204 with a shorter holder 206. FIGS. 13-16 show further alternative plant supports 208-214. The various plant supports and support structures may be combined to provide a plurality of configurations.

As will be clear those of skill in the art, the illustrated and discussed embodiments of the present invention may be altered in various ways without departing from the scope or teaching of the present invention. It is the following claims, including all equivalents, which define the scope of the present invention.

The invention claimed is:

1. A system for wastewater treatment using aquatic plants in a wastewater environment having an inlet, an outlet and a treatment zone extending between the inlet and outlet, wastewater being disposed in the treatment zone and flowing into the treatment zone from the inlet and out of the treatment zone from the outlet, the system comprising:
 an outlet barrier structure for controlling a flow of wastewater from a treatment zone to an outlet from the wastewater environment, the outlet barrier structure comprising:
  a base having a lower portion disposed on a bottom of the wastewater environment adjacent the outlet and an guide portion extending upwardly therefrom, the base having a negative buoyancy;
  an upper portion movably engaging the guide portion of the base, the upper portion having a top edge, the upper portion having an adjustable buoyancy such a position of the upper portion relative to an upper surface of the wastewater at the outlet may be adjusted by adjusting the buoyancy of the upper portion;
 a first immersed support structure with adjustable buoyancy for supporting aquatic plants in the wastewater environment, the first support structure disposed in the wastewater in the treatment zone, the first support structure comprising:
  a support frame;
  a plurality of plant holders each having a plant receiving area, the plant holders being interconnected with the support frame such that some of the plant holders are disposed at a first vertical position and others of the plant holders are disposed at a second vertical position;
  wherein the support structure has adjustable buoyancy such that a position of the support structure relative to the upper surface of the wastewater in the treatment zone may be adjusted by adjusting the buoyancy of the support structure, whereby some of the plant holders are positioned at a first depth and others of the plant holders are disposed at a second depth with respect to the upper surface of the wastewater.

2. A system for wastewater treatment in accordance with claim 1, wherein:
 the first support structure has an upper region and a lower region, the first support structure having a buoyancy chamber defined therein and an air inlet in fluid communication with the buoyancy chamber such that air is injected through the air inlet to increase the buoyancy of the support structure.

3. A system for wastewater treatment in accordance with claim 2, wherein:
 the air inlet is disposed in the upper region of the first support structure, the first support structure further having a water outlet in the lower region, the water outlet being in fluid communication with the buoyancy chamber such that as air is injected into the buoyancy chamber, water is displaced through the water outlet, and as air is removed from the buoyancy chamber, water flows into the buoyancy chamber from the water outlet.

4. A system for wastewater treatment in accordance with claim 2, wherein:

the air inlet is an opening in a lower region of the first support structure, the opening being in fluid communication with the buoyancy chamber such that as air is injected into the buoyancy chamber, water is displaced through the opening, and as air is removed from the buoyancy chamber, water flows into the buoyancy chamber from the opening.

5. A system for wastewater treatment in accordance with claim 1, wherein:
the first support structure has a liquid inlet, a plurality of liquid outlets, and a liquid passage connecting the liquid inlet with the plurality of liquid outlets, the liquid outlets being located such that liquid provided through the liquid inlet is distributed through the plurality of outlets to the wastewater environment.

6. A system for wastewater treatment in accordance with claim 5, wherein:
the first support structure having a buoyancy chamber defined therein, the buoyancy chamber defining part of the liquid passage such that liquid provided through the liquid inlet flows through the buoyancy chamber, the first support structure further having an air supply tube or an air valve in fluid communication with the buoyancy chamber for adjusting a quantity of air in the buoyancy chamber and thereby adjusting the buoyancy of the support structure.

7. A system for wastewater treatment in accordance with claim 1, further comprising:
a second support structure for supporting aquatic plants in the wastewater environment, the structure disposed in the wastewater in the treatment zone, the support structure comprising:
four elongated support members interconnected to form a generally rectangular perimeter;
a plurality of plant holders interconnected with the support members, each plant holder having a plant receiving area.

8. A system for wastewater treatment in accordance with claim 1, further comprising:
a first plurality of aquatic plants disposed on some of the plant supports; and
a second plurality of aquatic plants disposed on others of the plant supports;
wherein the first plurality and second plurality of aquatic plants are different categories of aquatic plants, the categories being selected from the group of categories consisting of emergent macrophytes, floating leaf macrophytes, and submerged leaf macrophytes.

9. A system for wastewater treatment in accordance with claim 1, further comprising:
an inlet barrier structure for controlling a flow of water into the treatment zone, the inlet barrier structure comprising:
a base having a lower portion disposed on a bottom of the wastewater environment adjacent the inlet and an guide portion extending upwardly therefrom, the base having a negative buoyancy; and
an upper portion movably engaging the guide portion of the base, the upper portion having a top edge, the upper portion having an adjustable buoyancy such a position of the upper portion relative to an upper surface of the wastewater at the inlet may be adjusted by adjusting the buoyancy of the upper portion.

10. A system for wastewater treatment in accordance with claim 9, wherein:
the inlet barrier system further comprises a skimmer element interconnected with the upper portion and spaced from the top edge, the skimmer element being disposed at the upper surface of the wastewater.

11. A system for wasterwater treatment in accordance with claim 9, wherein:
the upper portions of the inlet and outlet barrier structures each have a buoyancy chamber defined therein and an air inlet in fluid communication with the buoyancy chamber, the buoyancy of the upper portions being adjusted by adjusting the quantity of air in the buoyancy chambers.

12. A system for wasterwater treatment in accordance with claim 9, wherein:
each of the barrier structures further comprises a motor operable to move the upper portion relative to the base.

13. A system for wasterwater treatment in accordance with claim 1, further comprising:
a skirt element interconnected with the first support structure and extending downwardly therefrom, the skirt element defining a barrier for directing the flow of wastewater relative to the support structure.

14. A system for wasterwater treatment in accordance with claim 1, further comprising:
an anchoring system for maintaining a position of the first support structure, the anchoring system including a plurality of anchoring elements each including a foot disposed on the bottom of the treatment zone and a post extending upwardly therefrom;
the first support structure further including a plurality of guides attached thereto, the guides each slidably receiving a post such that the first support structure slides upwardly and downwardly on the posts as the level of wastewater changes.

15. A system for wasterwater treatment in accordance with claim 1, wherein:
the barrier structure further includes a pair of lateral supports disposed at opposite ends of the upper portion and extending downwardly to the bottom.

16. A system for wastewater treatment using aquatic plants in a wastewater environment having an inlet, an outlet and a treatment zone extending between the inlet and outlet, wastewater being disposed in the treatment zone and flowing into the treatment zone from the inlet and out of the treatment zone from the outlet, the system comprising:
a plurality of immersed adjustably buoyant support structures for supporting aquatic plants in the wastewater environment, each structure disposed in the wastewater in the treatment zone, each support structure comprising:
a support frame having a buoyancy chamber defined therein, an air inlet in fluid communication with the buoyancy chamber for adjusting the quantity of air in the buoyancy chamber, thereby adjusting the buoyancy of the support structure; and
a plurality of plant holders each having a plant receiving area, the plant holders being interconnected with the support frame;
a plurality of skirt elements each comprising a barrier with an upper end and a lower part extending downwardly towards a bottom of the treatment zone such that a flow of wastewater is redirected by each skirt element;
a first plurality of aquatic plants disposed on some of the plant supports, the plants being selected from the group of categories consisting of emergent macrophytes, floating leaf macrophytes, and submerged leaf macrophytes;
wherein the buoyancy of the support structures is adjusted such that each support structure is submerged in the wastewater and the support structure and plants are neutrally buoyant in the wastewater in the treatment zone.

17. A system for wastewater treatment in accordance with claim 16, further comprising:
    an outlet barrier structure for controlling a flow of wastewater from a treatment zone to an outlet from the wastewater environment, the outlet barrier structure comprising:
        a base having a lower portion disposed on a bottom of the wastewater environment adjacent the outlet and an guide portion extending upwardly therefrom, the base having a negative buoyancy;
        an upper portion movably engaging the guide portion of the base, the upper portion having a top edge, the upper portion having an adjustable buoyancy such a position of the upper portion relative to an upper surface of the wastewater at the outlet may be adjusted by adjusting the buoyancy of the upper portion.

18. A system for wastewater treatment in accordance with claim 16, wherein:
    the buoyancy of the support structures is adjusted such that some of the support structures are disposed at a first position relative to an upper surface of the wastewater and others of the support structures are disposed at a second position relative to the upper surface of the wastewater;
    the system further including a second plurality of aquatic plants, the second plurality of aquatic plants being a different category of plant from the first plurality of plants;
    the system further including an anchoring system for maintaining a position of each support structure, the anchoring system including a plurality of anchoring elements each including a foot disposed on the bottom of the treatment zone and a post extending upwardly therefrom;
    the support structures each further including a plurality of guides attached thereto, the guides each slidably receiving a post such that the support structures slide upwardly and downwardly on the posts as the level of wastewater changes;
    wherein some of the plants supported by the holders are positioned at a first depth and others of the plants supported by the plant holders are disposed at a second depth with respect to the upper surface of the wastewater.

19. A method of treating wastewater using aquatic plants, the method comprising:
    providing a plurality of support structures each having support elements and a plurality of plant holders interconnected with the support elements, the plant holders each having a plant receiving area, the plurality of support structures including at least a first group of support structures and a second group of support structures;
    providing a first plurality of aquatic plants and disposing the plants on plant holders of the first group of the support structures;
    providing a second plurality of aquatic plants and disposing bases of the plants on plant holders of the second group of the support structures;
    wherein the first plurality and second plurality of aquatic plants are different categories of aquatic plants, the categories being selected from the group of categories consisting of emergent macrophytes, floating leaf macrophytes, and submerged leaf macrophytes;
    disposing the support structures in a wastewater environment, the wastewater environment having an upper surface; and
    adjusting the buoyancy of the support structures such that each support structure with its respective plants has a generally neutral buoyancy and is immersed in the wastewater environment, the buoyancy being adjusted such that the first group of support structures is at a first depth with respect to the upper surface and the second group of support structures is at a second depth with respect to the upper surface, whereby the first plurality of aquatic plants are adjacent the surface of the wastewater environment and the bases of the second plurality of aquatic plants are submerged.

20. A method of treating wastewater in accordance with claim 19, wherein:
    each support structure further includes a buoyancy chamber and an air inlet in fluid communication with the buoyancy chamber, the buoyancy adjusting step comprising adjusting the quantity of air in the buoyancy chamber.

21. A method of treating wastewater in accordance with claim 19, wherein:
    the support structure further includes a liquid inlet, a plurality of liquid outlets, and a liquid passage connecting the liquid inlet with the plurality of liquid outlets, the liquid outlets being located such that liquid provided through the liquid inlet is distributed through the plurality of outlets to the wastewater environment;
    the method further comprising distributing nutrients or bacteria to the wastewater environment by providing a liquid containing such nutrients or bacteria through the liquid inlet.

\* \* \* \* \*